United States Patent [19]
Unruh

[11] Patent Number: 6,007,004
[45] Date of Patent: Dec. 28, 1999

[54] CENTER PIVOT IRRIGATION SYSTEM

[75] Inventor: Rudy R. Unruh, Omaha, Nebr.

[73] Assignee: Valmont Industries, Inc., Valley, Nebr.

[21] Appl. No.: 09/152,400

[22] Filed: Sep. 14, 1998

[51] Int. Cl.[6] .................................................. B05B 3/12
[52] U.S. Cl. ........................ 239/729; 239/69; 239/73; 239/731; 239/744
[58] Field of Search ................................. 239/69, 71, 73, 239/DIG. 1, 726, 728, 729, 730, 731, 733, 743, 744, 739

[56] References Cited

U.S. PATENT DOCUMENTS

| | | | |
|---|---|---|---|
| 3,802,627 | 4/1974 | Seckler ..................................... | 239/729 |
| 3,902,668 | 9/1975 | Daugherty et al. ...................... | 239/177 |
| 4,161,292 | 7/1979 | Holloway et al. ........................ | 239/11 |
| 4,186,880 | 2/1980 | Jacobi et al. ............................. | 239/729 |
| 4,227,648 | 10/1980 | Holloway et al. ........................ | 239/11 |
| 4,249,698 | 2/1981 | Smith et al. ......................... | 239/729 X |
| 4,340,183 | 7/1982 | Kegel et al. .............................. | 239/729 |
| 4,508,269 | 4/1985 | Davis et al. .............................. | 239/729 |
| 4,674,681 | 6/1987 | Meis et al. ........................... | 239/729 X |
| 4,729,514 | 3/1988 | Ostrom et al. ........................... | 239/727 |
| 5,246,164 | 9/1993 | McCann et al. ....................... | 239/73 X |
| 5,341,995 | 8/1994 | Leatch ...................................... | 239/729 |
| 5,435,495 | 7/1995 | Davis ........................................ | 239/728 |
| 5,678,771 | 10/1997 | Chapman ................................. | 239/727 |

*Primary Examiner*—Andres Kashnikow
*Assistant Examiner*—Steven J. Ganey
*Attorney, Agent, or Firm*—Zarley, McKee, Thomte, Voorhees & Sease; Dennis L. Thomte

[57] ABSTRACT

An irrigation system is disclosed which includes a center pivot support having an elongated main water boom pivotally connected thereto which extends outwardly therefrom. A corner span is pivotally connected at its inner end to the outer end of the main boom and is supported by a steerable drive tower. An angle sensor is provided at the pivotal connector of said main boom and said corner span. A span sensor is positioned on the corner boom for sensing shape changes in the corner span. A control connects the span sensor and angle sensor with the drive and steering for driving and steering the steerable drive tower. The control means, when said extension boom is in a trailing position, actuates said steering means to follow the guidance means and actuating said speed control to maintain the shape of the corner span within predetermined parameters; said control means, when the corner span approaches full extension, actuates said speed control to keep the corner span in alignment with the main boom, as determined by the angle sensor and actuating said steering means to maintain the shape of the corner span within predetermined parameters as determined by the span sensor.

1 Claim, 11 Drawing Sheets

CENTER PIVOT IRRIGATION SYSTEM

BACKGROUND OF THE INVENTION

1. Field of the Invention

This invention relates to a center pivot irrigation system having the ability to irrigate the corners of the field being irrigated. More particularly, this invention relates to an improved means for controlling a center pivot last regular drive unit and corner span.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion which are supported upon a plurality of drive towers. In most conventional center pivot irrigation systems, the outermost or last regular drive tower or unit is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,627; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field. Perhaps the most popular method of guiding the extension tower is the buried wire system described in U.S. Pat. No. 3,902,668. However, many different types of systems for driving the wheels of the extension tower have been previously provided. See, for example, U.S. Pat. Nos. 4,508,269 and 4,674,681. Further, in assignee's current production model, relative movement between the main boom and the extension boom is sensed with the drive wheels on the steerable drive tower on the extension boom being driven when the main boom has moved forwardly a predetermined distance with respect to the extension boom. When the extension boom "catches up" with the main arm, the driving of the drive wheels on the extension tower is discontinued. This process is continuously repeated during the movement of the system through the field.

Prior to the instant invention, the corner span relied upon a speed control to maintain position with the last regular drive unit as discussed hereinabove. Therefore, the corner span was required to maintain a slight angle with the center pivot portion of the machine in order to control the joint position. The inability of the corner span to completely extend resulted in less area being irrigated.

SUMMARY OF THE INVENTION

A center pivot irrigation system with a corner span attachment is described herein which includes a center pivot support structure located in the field to be irrigated. An elongated main water boom, having inner and outer ends, is pivoted at its inner end to the center pivot support structure and extends outwardly therefrom. The main water boom is comprised of an elongated main water pipe supported upon a plurality of non-steerable drive towers which propel the main water pipe around the center pivot support structure. The last regular drive tower or outermost drive tower includes a pair of wheels which are driven by an electric motor. An elongated extension boom, also referred to as corner span, corner boom, or corner arm, having inner and outer ends, is pivotally connected at its inner end to the outer end of the main boom with the extension boom comprising an elongated extension water pipe supported upon at least one steerable drive tower. A steering means is provided for steering the drive wheels on the steerable drive tower as the main boom is moved through the field. A pair of variable speed motors are provided for selectively driving the drive wheels on the steerable drive tower. A guidance means is provided for controlling the steering means whereby the steerable drive tower is moved along a preselected path, as the main boom travels over the field to be irrigated, thereby causing the extension boom to be pivotally moved with respect to the main boom to cause the extension boom to pivotally extend out into corner areas of the field being irrigated and pivotally retract therefrom as the main boom travels through the field. An angle sensor is provided between the main boom and the corner span for measuring the angle therebetween.

The extension boom water pipe is normally bowed upwardly slightly by means of a conventional undertruss system as are the spans on the main arm. A span sensor is positioned on the extension boom water pipe for sensing the forces within the entire corner span. The span sensor determines changes in the shape of the corner span (change in applied load—relative load) and the speed of the corner drive motors may be adjusted to correct for such shape changes. Using this method, the relative motion between the two spans is eliminated and the only motion at the joint is due to terrain and corner extension and retraction. This permits a standard ball and socket joint to be used between the two spans. The instant invention utilizes both speed and steering control along with the span sensor and the angle sensor to enable the corner span to be fully extended. This is accomplished by using the steering control to follow the guidance means and the speed control to maintain minimum tension or compression in the corner span when the corner span is in the trailing position. When the corner span reaches a position approaching full extension, the control is switched to utilize speed to keep the corner span in line with the main boom as determined by the corner angle sensor, and steering control to maintain minimum tension or compression in the corner span as determined by the span sensor.

It is therefore a principal object of the invention to provide an improved center pivot irrigation system having a corner arm system mounted thereon.

Still another object of the invention is to provide an improved method of controlling the driving of the corner arm extension boom mounted on the outer end of a center pivot irrigation system to enable the corner arm to fully extend.

Still another object of the invention is to provide a device of the type described which eliminates a vast number of the moving parts of conventional corner arm driving means, thereby substantially reducing maintenance problems.

Still another object of the invention is to provide a system of the type described which is economical of manufacture and durable in use.

These and other objects will be apparent to those skilled in the art.

DESCRIPTION OF THE PREFERRED EMBODIMENT

Figure 1:
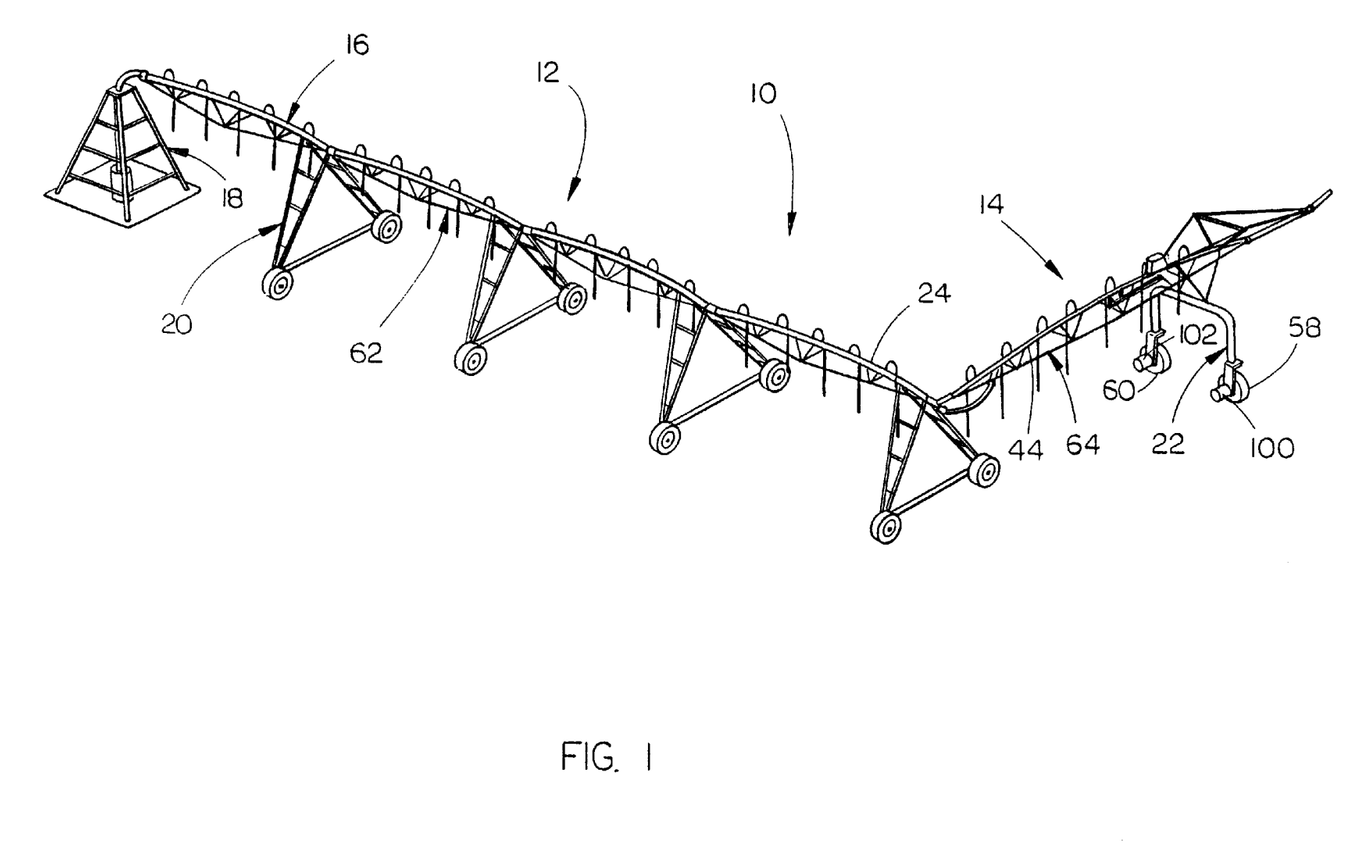
FIG. 1 is a perspective view of a center pivot irrigation system having a corner span pivotally mounted to the outer end thereof.

The numeral 10 refers generally to a self-propelled irrigation system which is comprised of a center pivot irrigation system 12 having a corner irrigation system, corner arm, corner span, corner boom or extension boom 14 pivotally connected to the outer end thereof. Generally speaking, center pivot irrigation system 12 is of conventional design and includes a main water conduit or boom 16 which extends outwardly from a conventional center pivot structure 18. Main boom 16 is supported by a plurality of drive towers 20 in conventional fashion. The drive towers 20 are designed to propel the center pivot system around the center pivot structure 18 in conventional fashion. Corner span 14 is supported upon a steerable drive tower 22.

Figure 2:
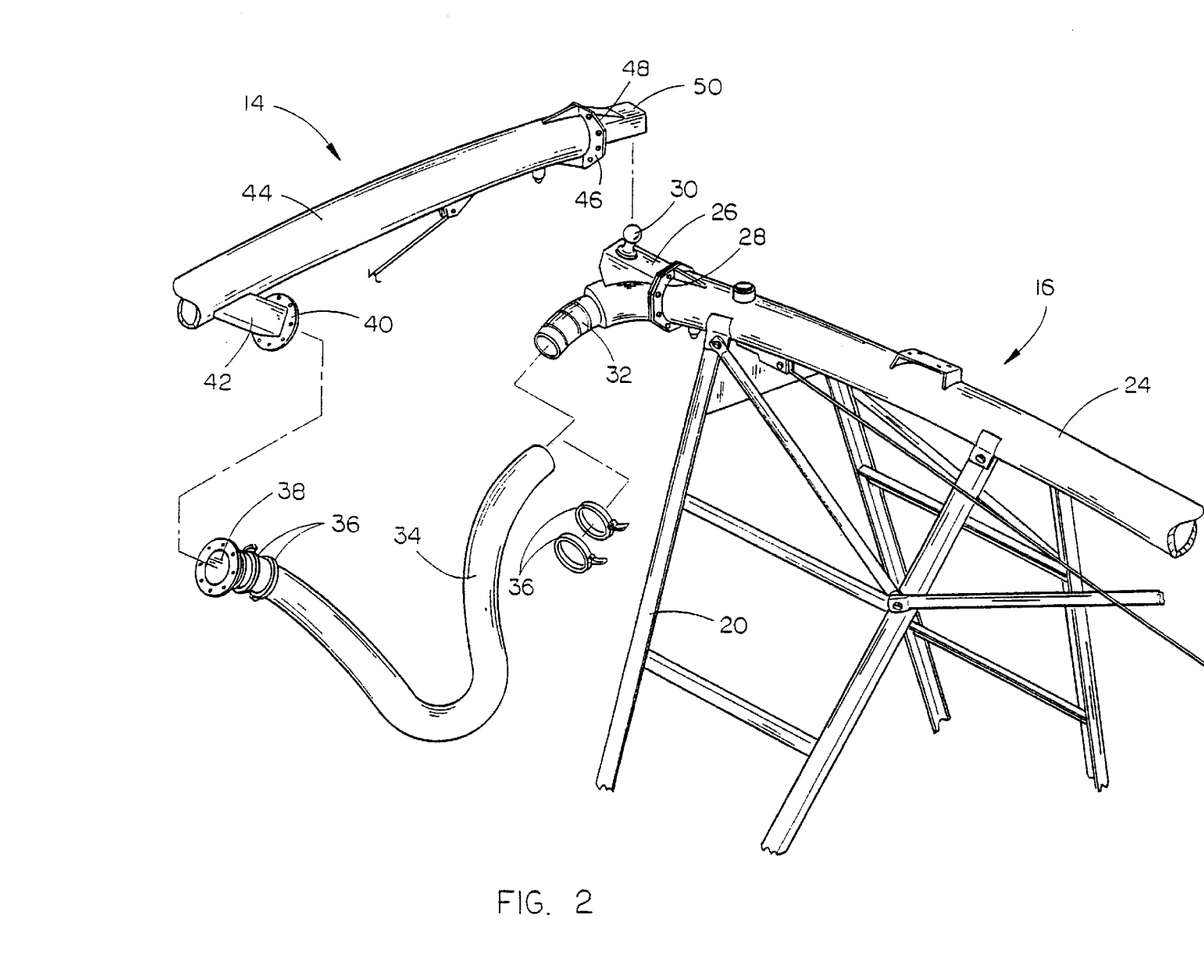
FIG. 2 is an exploded perspective view of the connection between the main boom and corner boom.
Figure 3:
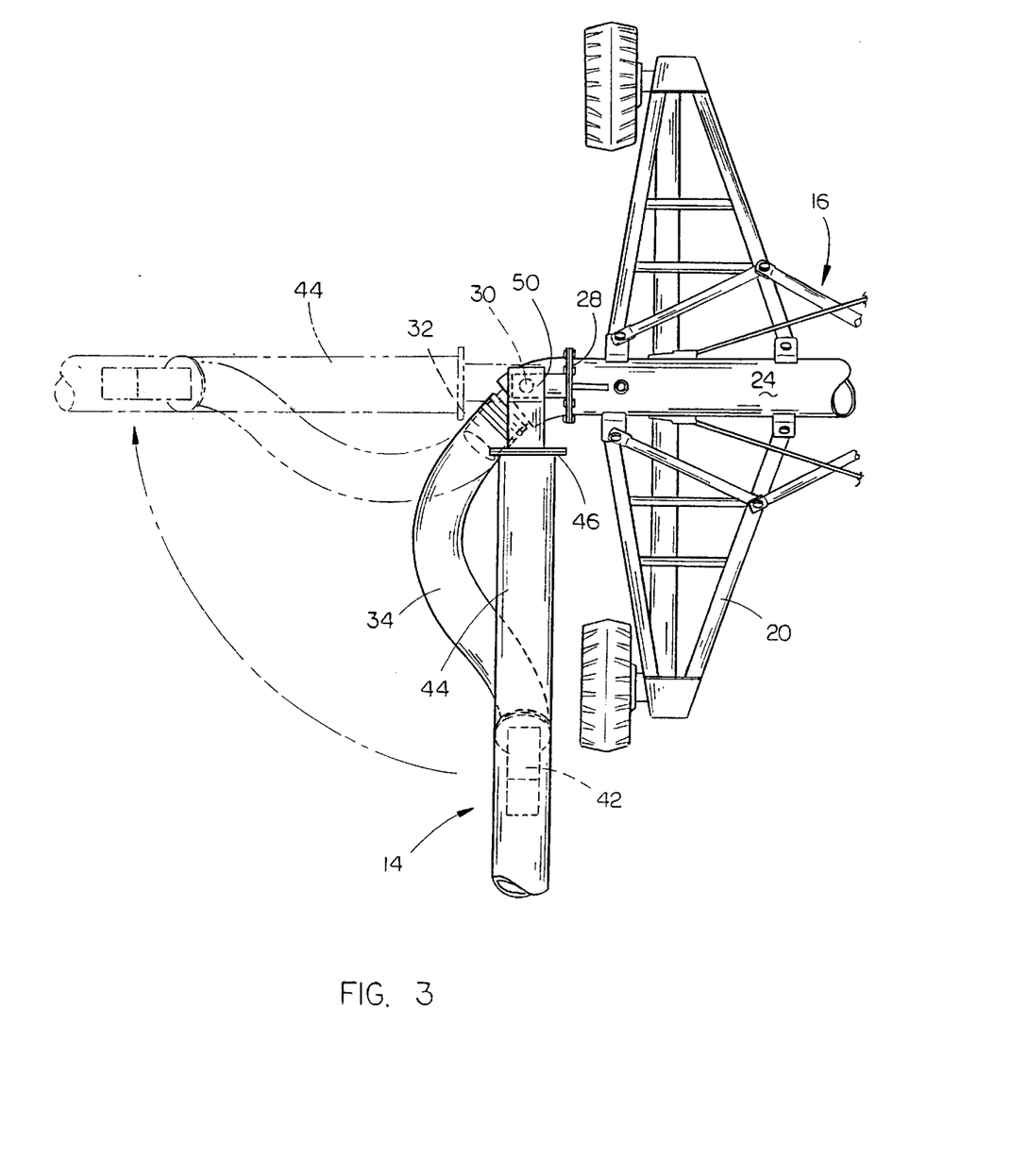
FIG. 3 is a top elevational view of the connection of FIG. 2 with the broken lines illustrating the corner span in its completely extended position.
Figure 4:
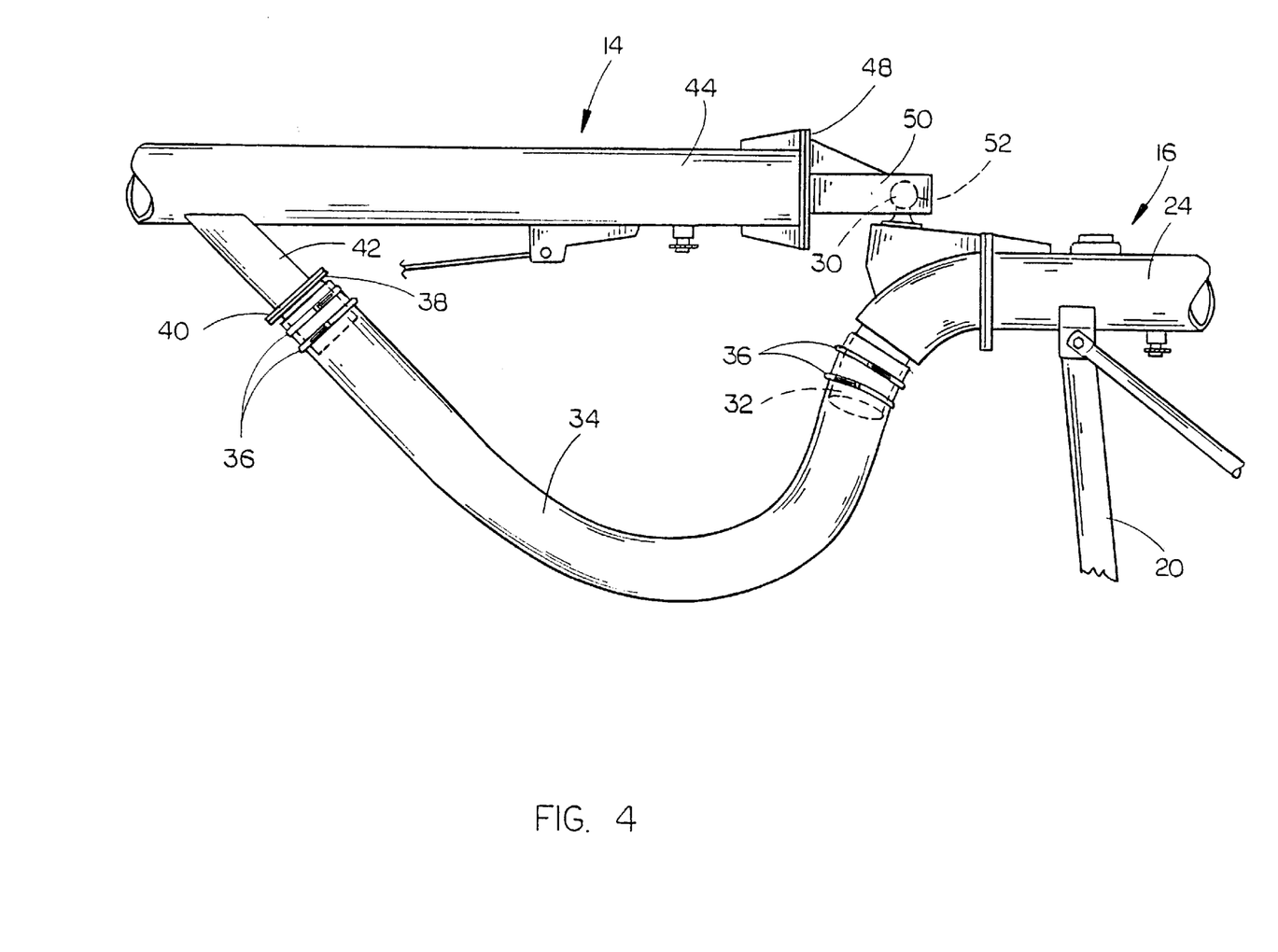
FIG. 4 is a side elevational view of the connection of FIG. 2.
Figure 5:
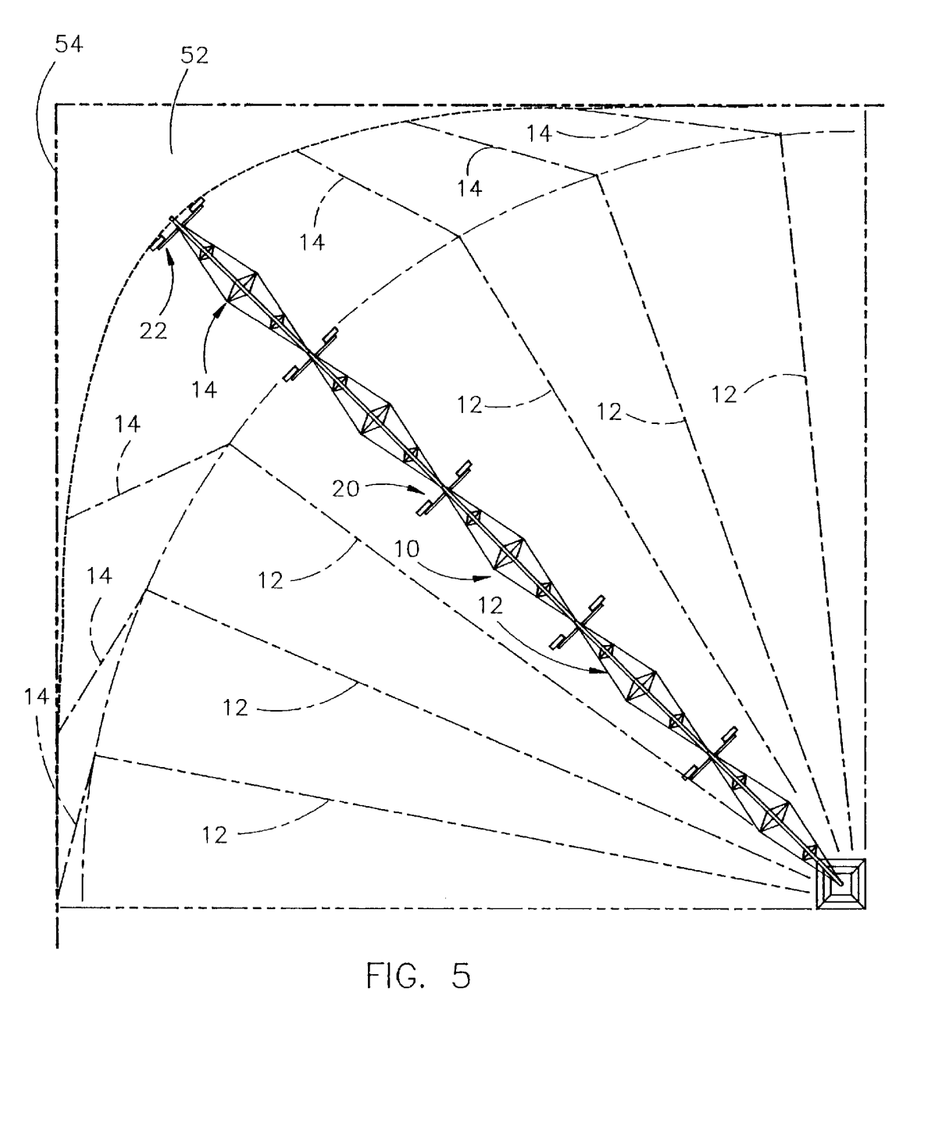
FIG. 5 is a plan view illustrating the corner arm irrigation system of this invention.

Referring to FIG. 2, the numeral 24 refers to the outermost pipe section of the main water conduit 16. Support 26 is secured to the annular plate 28 mounted at the outer end of pipe section 24 and has a hitch ball 30 mounted thereon. Support 26 includes an arcuate pipe or elbow section 32 which extends downwardly, outwardly and rearwardly from the pipe section 24, as seen in FIG. 2. One end of connecting hose 34 is mounted on elbow 32 and is maintained thereon by conventional retainers 36. The other end of hose 34 has a flanged pipe 38 secured thereto which is adapted to be secured to the flange 40 which is mounted on the lower inner end of tubular member 42 which extends downwardly from the inner end of the water conduit or extension water pipe 44 of corner arm 14. The inner end of water conduit or pipe 44 is provided with an annular flange 46 which is sealed by means of plate 48 having beam 50 extending therefrom. The underside of beam 50 is provided with a ball-shaped pocket 52 which is adapted to receive the hitch ball 30, as illustrated in FIG. 4. As illustrated in FIG. 5, the corner span 14 trails the main boom 12 and is moved out into the corner 52 of the field 54 so that the corners of the field may be irrigated, as will be described hereinafter. A conventional angle sensor 55 is provided between the main boom and corner boom for sensing the angel therebetween.

As stated, the numeral 14 refers to a corner span including an extension water pipe 44 which is supported by at least one steerable drive tower 22 including a pair of steerable drive wheels 58 and 60. The drive wheels 58 and 60 are steered by any convenient means such as the system disclosed in U.S. Pat. No. 3,902,668 so that the extension boom or corner span will be pivotally moved with respect to the main boom to cause the corner span to pivotally extend out into corner areas of the field and pivotally retract therefrom as the main boom travels through the field. However, the corner spans of the prior art could not, to the best of applicant's knowledge, fully extend.

In most center pivot irrigation systems, the outermost drive tower is the master tower with the drive towers inwardly therefrom being slave towers. In other words, the outermost master drive tower (L.R.D.U.) is driven with the other drive towers being actuated by conventional alignment means so that the main boom remains in generally longitudinal alignment.

As the main boom 16 is moved through the field, the drive wheels 58 and 60 on the tower 22 must be driven so that the corner span "keeps up" with the main boom. In most prior art corner systems, many moving parts are provided between the outer end of the main boom and the inner end of the corner span. The means for controlling the driving of the drive wheels on the corner drive tower also involves several moving parts which require considerable maintenance. In an effort to eliminate the prior art maintenance problems of the means for driving the drive tower on the corner span and to permit the corner span to fully extend, the instant invention has been provided which includes the use of speed and steering control in combination with an angle sensor and span sensor.

Figure 7:
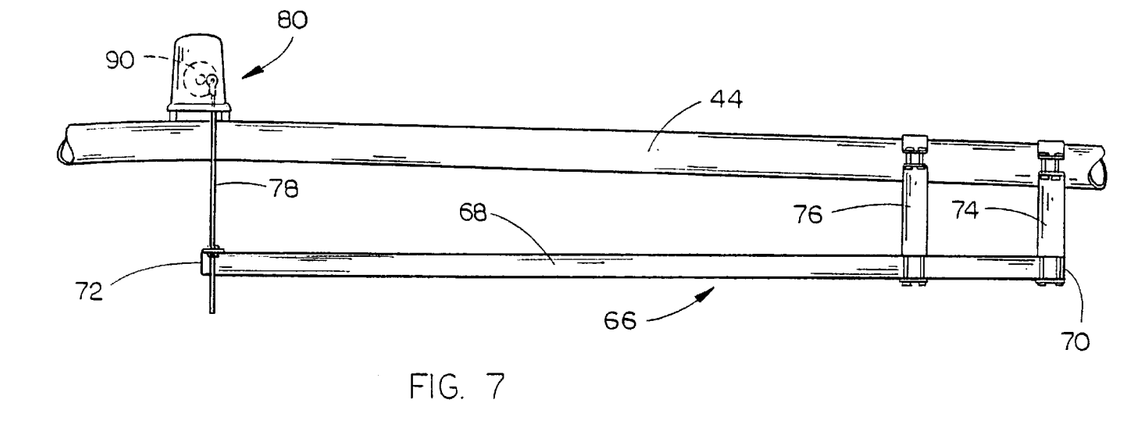
FIG. 7 is a side view of the span sensor of this invention illustrating the corner span in its normally upwardly bowed position which places the corner span in compression.
Figure 8:
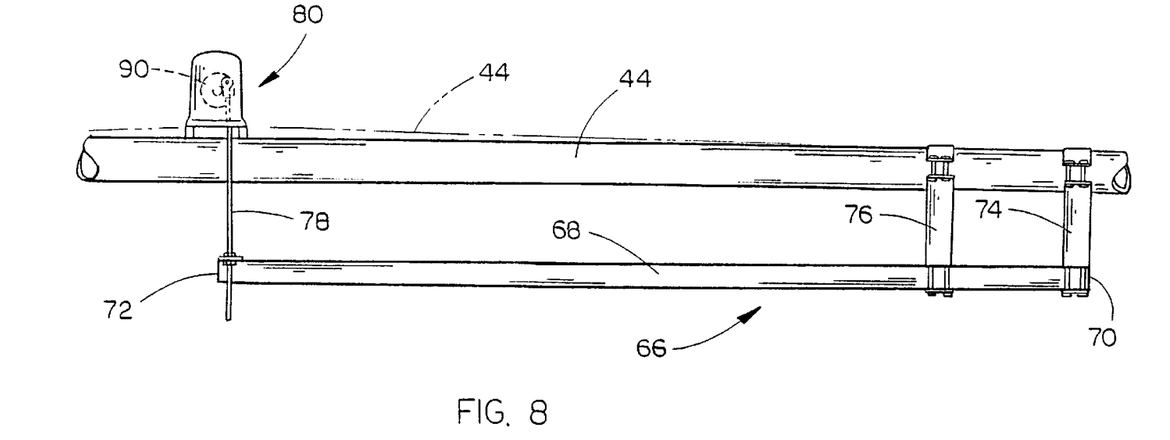
FIG. 8 is a side view similar to FIG. 7 except that the corner span has been moved downwardly from the position of FIG. 7.
Figure 9:
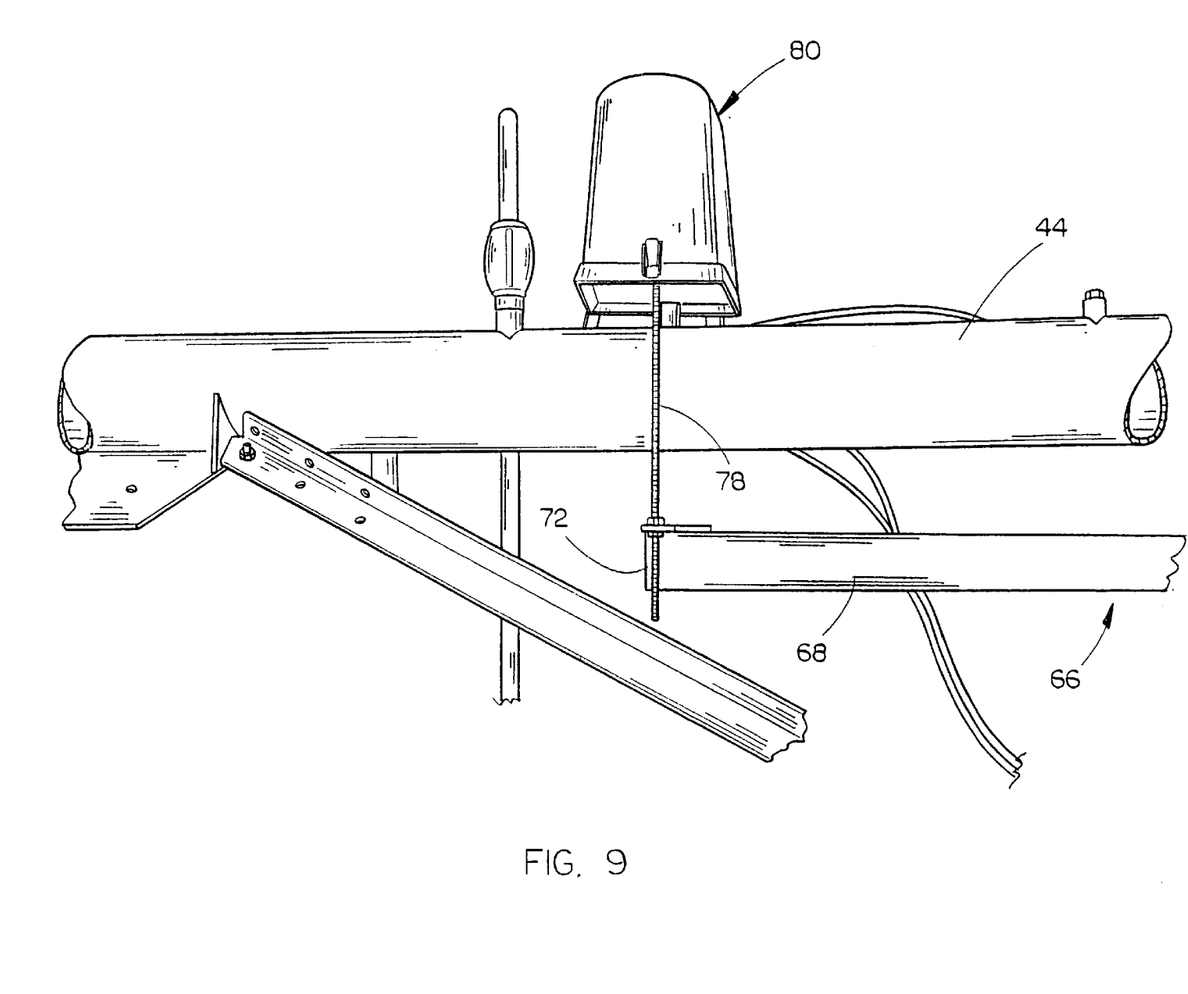
FIG. 9 is a partial bottom perspective view of one end of the span sensor.

As seen in FIG. 1, the main boom 12 includes a conventional undertruss system 62 which bows the water pipes between drive towers 20 upwardly. A suitable conventional undertruss system 64 is also provided on the corner span 14 which normally bows the extension water pipe upwardly to the configuration or shape seen in FIG. 7. In its normal upwardly bowed position of FIG. 7, the corner span is in compression. A span sensor 66 is provided on the extension water pipe 44 for sensing changes in the shape of the corner span caused by a change in the applied load. Although the span sensor 66 described herein is the preferred embodiment, a strain gauge could also possibly be used.

Figure 6:
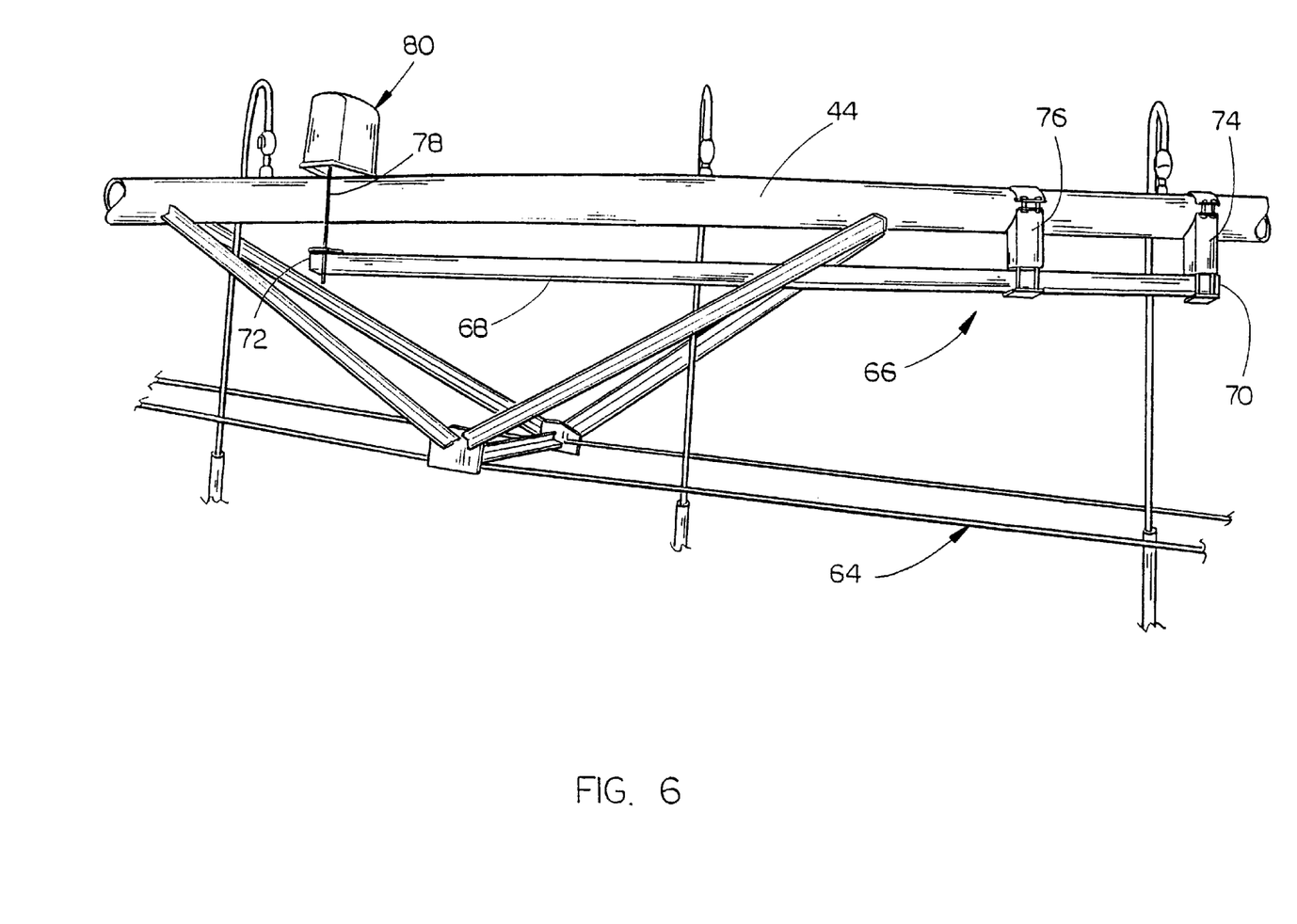
FIG. 6 is a perspective view of the span sensor of this invention.

Span sensor 66 includes an elongated beam 68 which is positioned beneath extension water pipe 56 in a horizontally disposed position and which includes an inner end 70 and an outer end 72. A pair of supports 74 and 76 secure the inner end of the beam 68 to the water pipe 56, as seen in the drawings. An externally threaded rod 78 is vertically adjustably secured to the outer end 72 of beam 68 and extends upwardly therefrom to a control means generally referred to by the reference numeral 80. Control means 80 includes a pair of vertically disposed support plates 82 and 84 having a plurality of spacer bolts 86 extending therebetween.

Figure 10:
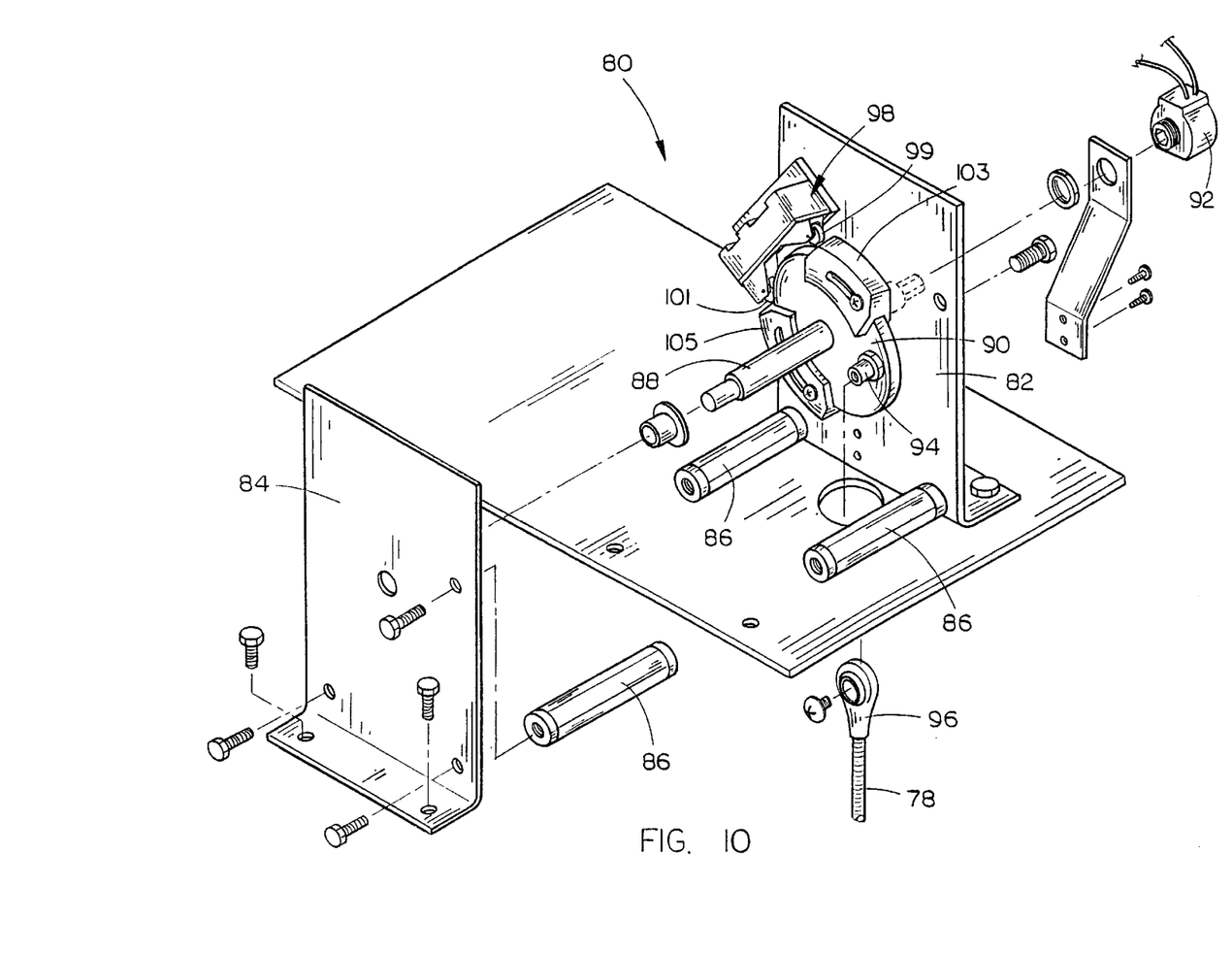
FIG. 10 is an exploded perspective view of the control portion of the span sensor.
Figure 11:
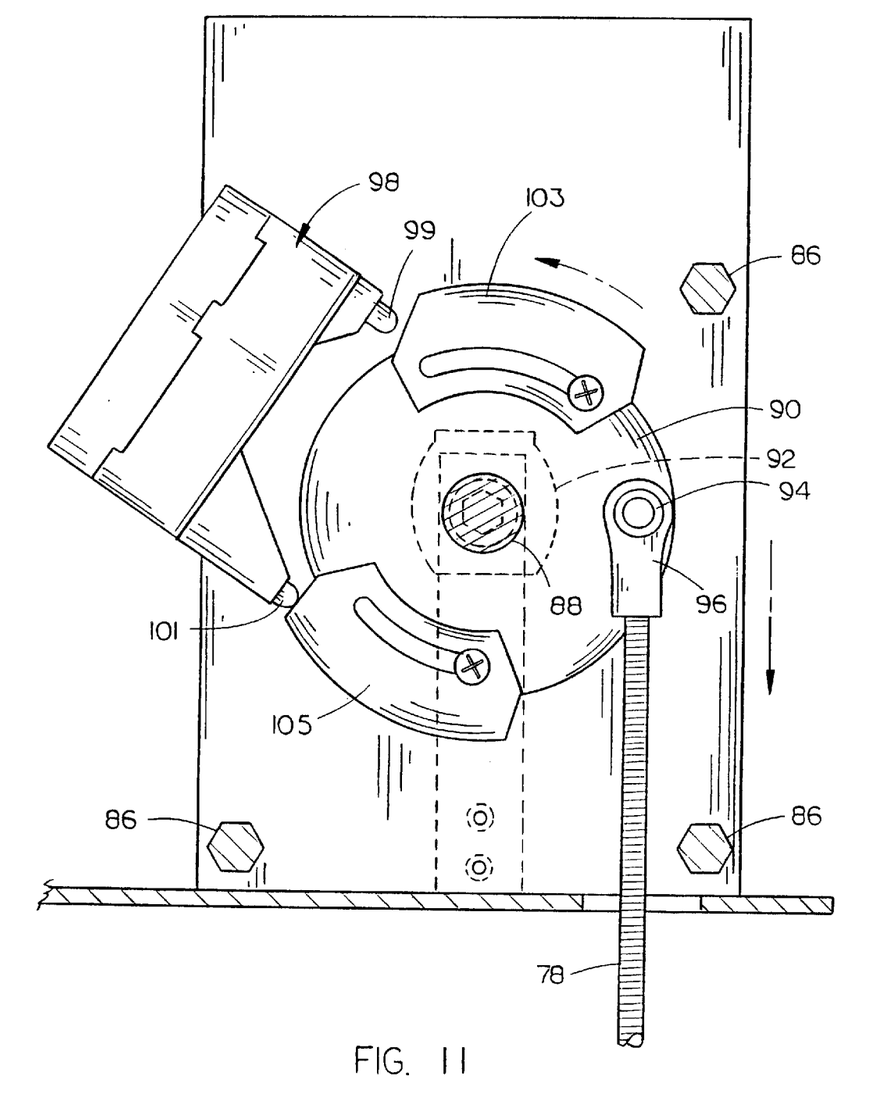
FIG. 11 is a side elevational view of the control portion of FIG. 10.
Figure 12:
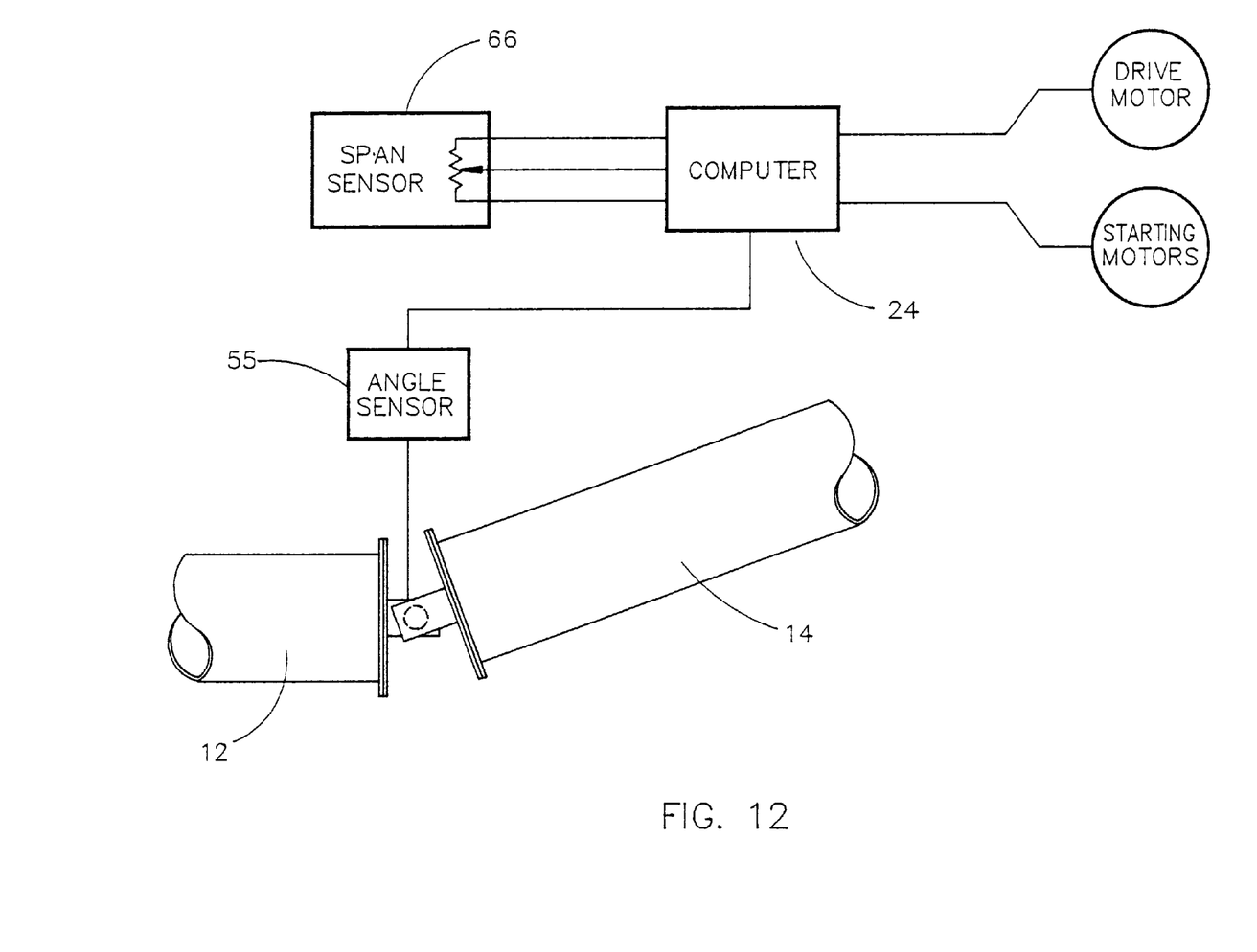
FIG. 12 is a schematic of the circuitry connecting the span sensor, angle sensor, drive motors and steering motors and variable speed motors.

Shaft 88 is rotatably mounted in and extends between plates 82 and 84 and has cam 90 mounted thereon for rotation therewith. One end of shaft 88 extends through plate 82 and is connected to a conventional potentiometer 92 whereby rotation of shaft 88 causes the electrical potential of potentiometer 92 to be either increased or decreased depending upon the direction of rotation of shaft 88. Cam 90 has a shaft or stub 94 extending therefrom which rotatably receives the upper end of a connector 96. The lower end of connector 96 threadably receives the upper end of rod 78.

The numeral 98 refers to a safety switch, including switches 99 and 101, mounted on the inside surface of plate 82 above cam 90 which is actuated by cam plates 103 and 105, respectively, to deactivate the entire electrical system should the extension boom 14 fail to maintain its proper operating position with respect to the main boom.

As the main boom 16 is propelled around the center pivot structure 18 by the drive towers 20 in conventional fashion, the extension boom 14 is driven and steered by the drive wheels 58 and 60 and follows along behind the main boom 16 and is guided out into the corners of the field by the guidance system previously described. If the main boom 16 moves away from the extension boom 14, the shape of the corner span changes due to a change in the applied load. In other words, the compression in the corner span is reduced somewhat which causes the pipe 56 to move downwardly somewhat from its normally upwardly bowed position. The downward movement of pipe 56 causes control means 80 to move downwardly with respect to control rod 78, thereby causing cam 90 to be rotated in a counterclockwise direction, as viewed from the left in FIG. 10, which results in the potentiometer 92 being actuated which normally in turn changes or adjusts the speed of the variable speed drive motors 100 and 102 on drive wheels 58 and 60 so that the compression in the corner span is increased somewhat which tends to bow the corner span upwardly towards its normal position which in turn causes cam 90 to be rotated to rotate potentiometer 92 in an opposite direction to that described hereinabove. The sensing of the upward and downward bowing or deflection of the water pipe 56 is constantly monitored to control the driving of the drive wheels 58 and 60.

Using the variable speed drive on the corner drive allows the corner span to move continuously. Span sensor 66 is used to determine if shape changes in the corner span with the speed of the corner drive motors being adjusted to correct for the shape changes using well-known techniques. Using this method, the relative motion between the two spans is eliminated and the only motion is at the joint due to terrain and corner extension and retraction. This allows a standard ball and socket joint to be used between the two spans. By using both speed control and steering control along with span sensor 66 which determines shape changes in the corner span in combination with the angle sensor 55, the corner span will be fully extended into a direct line with the main irrigation machine. This is accomplished by using the steering control to follow the guidance wire, or other guidance means, and the speed control to maintain minimum tension or compression when the corner is in the trailing position. When the corner span reaches a position approaching full extension, the control is switched to use speed to keep the corner span in alignment with the main boom as determined by the corner angle sensor 55 and the steering control to maintain minimum compression in the corner span as determined by the span sensor 66.

Thus it can be seen that the invention accomplishes at least all of its stated objectives.

I claim:

1. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon a plurality of non-steerable drive towers which propel said main water pipe around said center pivot support structure;

said non-steerable drive towers including a last regular drive tower;

a corner span, having inner and outer ends, pivotally connected at its said inner end to said outer end of said main boom;

said corner span comprising an elongated extension water pipe supported upon at least one steerable drive tower;

steering means for steering said steerable drive tower;

drive means for driving said steerable drive tower;

guidance means for controlling said steering means so that said steerable drive tower is moved along a preselected path, as said main boom travels over the field to be irrigated, thereby causing said extension boom to pivotally move with respect to said main boom to cause said extension boom to pivotally extend out into corner areas of the field and pivotally retract therefrom as said main boom travels through the field;

a span sensor positioned on said extension water pipe for sensing shape changes in said corner span;

an angle sensor at the pivotal connection of said main boom and said corner boom for sensing the angle therebetween;

control means connecting said span sensor, said angle sensor, said steering means and said drive means for adjusting the speed and steering of the said steerable drive tower;

said control means, when said extension boom is in a trailing position, actuating said steering means to follow the guidance means and actuating said speed control to maintain the shape of said corner span within predetermined parameters;

said control means, when said corner span approaches full extension, actuating said speed control to keep the corner span in alignment with said main boom, as determined by said angle sensor, and actuating said steering means to maintain the shape of said corner span within predetermined parameters as determined by said span sensor.

* * * * *